(12) United States Patent
Watts

(10) Patent No.: US 10,511,747 B2
(45) Date of Patent: Dec. 17, 2019

(54) SUSPENSION SYSTEM FOR SUPPORTING AND MOVING EQUIPMENT

(71) Applicant: David Gregory Watts, Tokyo (JP)

(72) Inventor: David Gregory Watts, Tokyo (JP)

( * ) Notice: Subject to any disclaimer, the term of this patent is extended or adjusted under 35 U.S.C. 154(b) by 82 days.

(21) Appl. No.: 14/555,602

(22) Filed: Nov. 27, 2014

(65) Prior Publication Data

US 2016/0156815 A1 Jun. 2, 2016

(51) Int. Cl.
*H04N 5/222* (2006.01)
*H04N 5/232* (2006.01)
*B66C 11/16* (2006.01)
*H04N 5/225* (2006.01)

(52) U.S. Cl.
CPC ............. *H04N 5/222* (2013.01); *B66C 11/16* (2013.01); *H04N 5/2251* (2013.01); *H04N 5/232* (2013.01)

(58) Field of Classification Search
CPC ......... B66C 11/16; B66C 21/00; B66C 21/04; B66C 21/08; B66C 21/10; H04N 5/222; H04N 5/232; H04N 5/2251; B61B 7/00; F16M 11/18
USPC ............... 212/76, 94, 95, 87, 313, 315, 316; 348/144
See application file for complete search history.

(56) References Cited

U.S. PATENT DOCUMENTS

| | | | | |
|---|---|---|---|---|
| 736,996 A | * | 8/1903 | Miller | B66C 21/00 212/72 |
| 2,601,585 A | * | 6/1952 | Bateman | B66C 21/00 212/72 |
| 3,065,861 A | * | 11/1962 | Cruciani | B66C 21/00 212/197 |
| 4,710,819 A | * | 12/1987 | Brown | F16M 11/10 212/76 |
| 5,224,426 A | * | 7/1993 | Rodnunsky | B61B 7/00 104/112 |
| 2004/0206715 A1 | * | 10/2004 | Rodnunsky | B66C 21/04 212/76 |
| 2005/0024005 A1 | * | 2/2005 | Rodnunsky | B66C 13/08 318/649 |

(Continued)

FOREIGN PATENT DOCUMENTS

CA 1052324 A * 4/1979 ............. B66C 21/04

*Primary Examiner* — Ryan D Kwiecinski

(57) ABSTRACT

A suspension system may comprise a flexible member, a mount, a reel and an equipment support member. The equipment support members are supported by the flexible member and the flexible member is in turn supported by the reel and at least one of an attachment point and a common point on the equipment support member. By extending and retracting the flexible member, the reel is capable of controlling the distances between the equipment support members so that any attached equipment can be supported and moved. In another embodiment there is a first and a second reel so that the distance between the mount and the first row can be controlled separately from the distances between the equipment support members. In another embodiment the equipment support member further comprises a second traveler capable of guiding the flexible member from the reel to an equipment support member through another equipment support member while still allowing the flexible member to support the first traveler and thus the reel can control the distance between this equipment support member and the common point above it.

1 Claim, 10 Drawing Sheets

(56) References Cited

U.S. PATENT DOCUMENTS

| | | | |
|---|---|---|---|
| 2011/0204196 A1* | 8/2011 | Wharton | G03B 15/00 248/323 |
| 2012/0298937 A1* | 11/2012 | Fisher | B66C 11/16 254/283 |
| 2013/0087751 A1* | 4/2013 | Kwon | B66D 1/48 254/268 |
| 2013/0238135 A1* | 9/2013 | Fisher | B66C 21/00 700/275 |
| 2013/0345876 A1* | 12/2013 | Rudakevych | B25J 9/1697 700/259 |

* cited by examiner

SUSPENSION SYSTEM FOR SUPPORTING AND MOVING EQUIPMENT

REFERENCES

U.S. Pat. No. 6,975,089 B2 System and method for facilitating fluid three-dimensional movement of an object via directional force.

US 20090207250 A1 Aerial camera system.

U.S. Pat. No. 4,710,819 A Suspension system for supporting and conveying equipment, such as a camera.

BACKGROUND OF THE INVENTION

Presently there is a situation in which there is a need to adjustably position equipment.

For example in the field of multi-view photogrammetry, cameras need to be positioned around a subject. The cameras are usually attached to a domed, cylindrical or tripod-based camera mounting system. If the subject is small or large, to better capture images of the subject's surface, the cameras can be zoomed in and out. In the case of the tripod-based camera mounting system the tripods are moved closer to or further from the subject. A suitable framing may not be possible if the camera lenses cannot zoom out far enough, especially for a large subject in a small camera system. Also the subject may be self-occluding so only repositioning the camera can overcome the self-occlusion. After the self-occlusion is overcome, redistributing the other cameras might also be necessary. This can take time especially for a large number of cameras which is usually the case with multi-view photogrammetry where more than 10 cameras are often used.

Thus, there remains a considerable need for devices and methods that can conveniently position multiple pieces of equipment.

BRIEF SUMMARY OF THE INVENTION

The present invention aims to solve one or more of these and other problems.

In a preferred embodiment of the present invention, a suspension system may comprise a flexible member, a mount, a reel and an equipment support member. Each equipment support member is supported by the flexible member and the flexible member is in turn supported by the reel and at least one of an attachment point and a common point. By extending and retracting the flexible member, the reel is capable of controlling the distances between the equipment support members so that any attached equipment can be supported and moved. In another embodiment there is a first and a second reel so that a first distance and a second distance can be controlled separately. In another embodiment the equipment support member further comprises a second traveler capable of guiding the flexible member from the reel to an equipment support member through another equipment support member while still allowing the flexible member to support the first traveler and thus the second reel can control the distance between this equipment support member and the common point on the equipment support member above it.

Among the many different possibilities contemplated, a suspension system may have a reel attached to a counterweight so that the power source can support and move the flexible members more easily. The second traveler may be rotationally isolated from the common point. The flexible member attaching the common point may be rotationally isolated from the common point. The flexible member may comprise a cable. Each of the first, second, and third travelers may comprise a pulley in a housing. The first traveler may more preferably comprise two pulleys. The common point may be found on the midpoint of the flexible member supporting the first traveler and between the two pulleys of the first traveler. The pulleys of the second traveler may be rotatable on axes of rotation which are perpendicular to a ray substantially coming from the common point and the common point connector. The suspended equipment support members may form a curved surface and thus the equipment may also be supported in a curved surface. There may be a positionable and lockable third traveler on the mount configured to control the position of both the suspension point and the attachment point from which the first row of equipment support members may be suspended.

DETAILED DESCRIPTION OF THE INVENTION

In the following description, the use of "a," "an," or "the" can refer to the plural. All examples given are for clarification only, and are not intended to limit the scope of the invention.

Figure 1A:
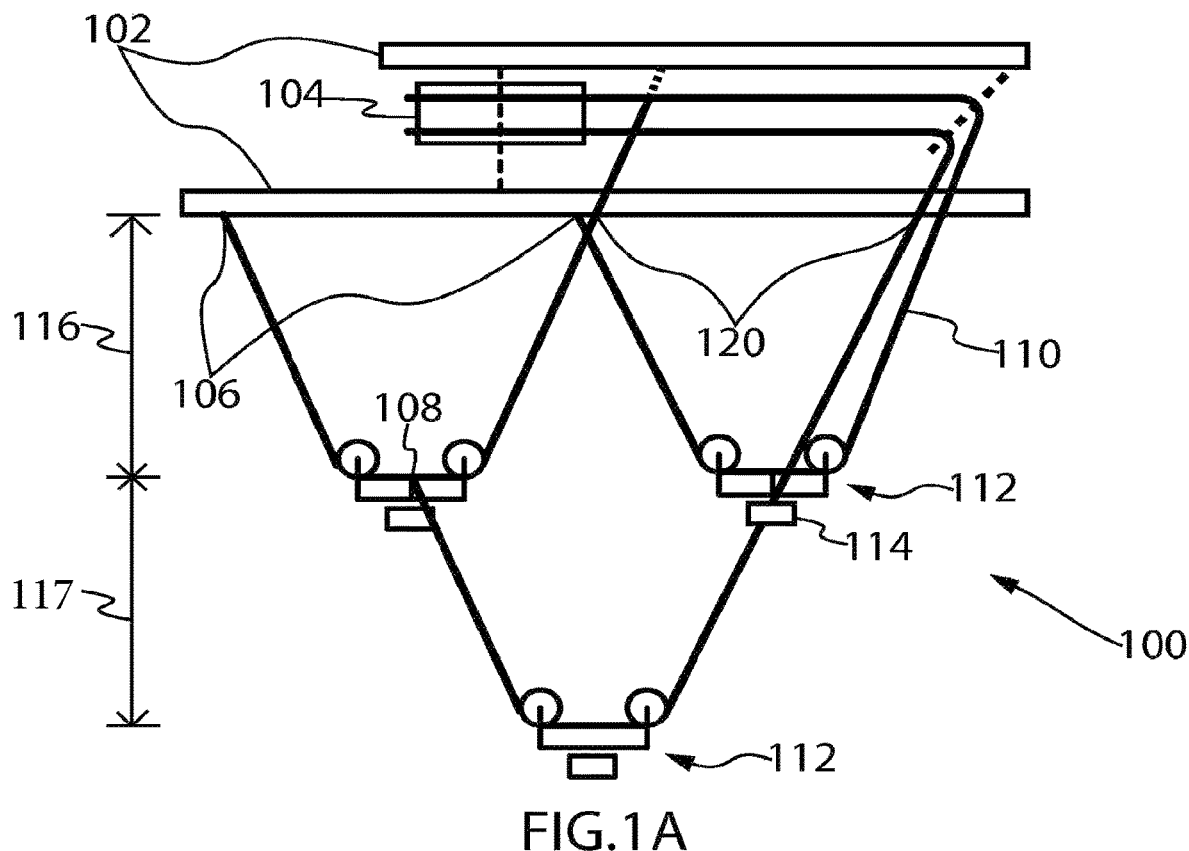
FIG. 1A shows a front view of a suspension system according to a preferred embodiment.
Figure 1B:
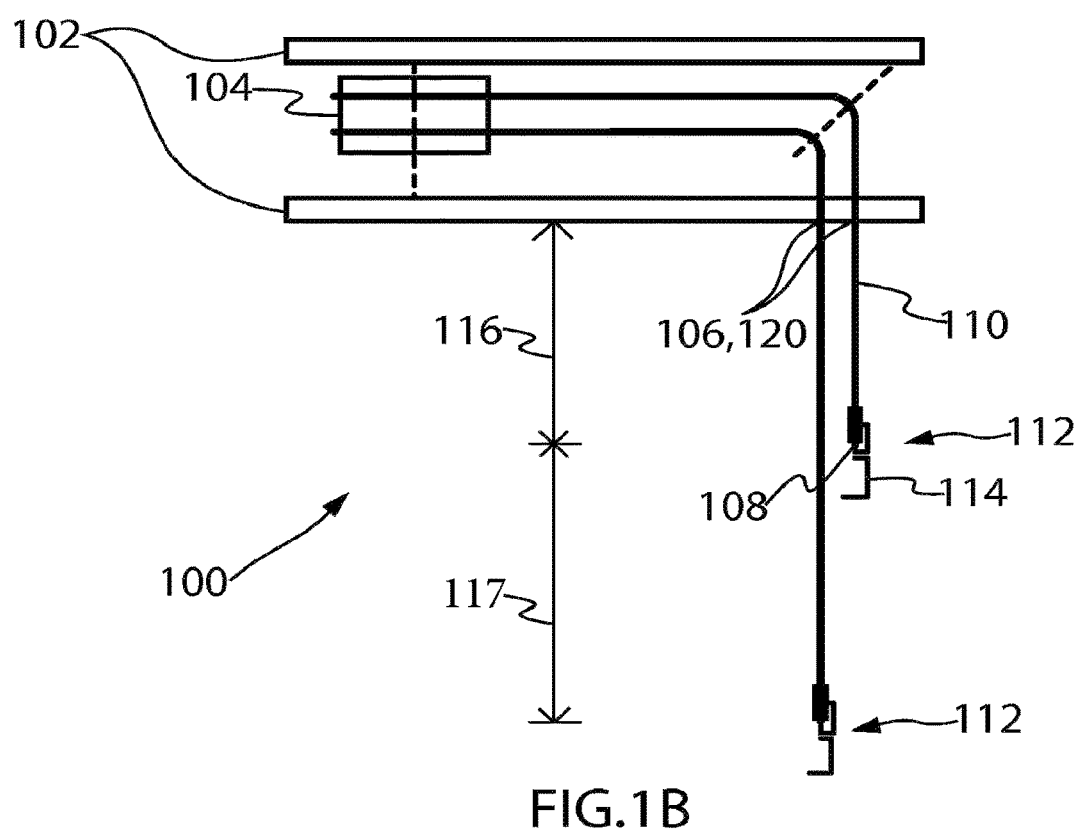
FIG. 1B shows a side view of a suspension system member according to a preferred embodiment.

Referring now to FIGS. 1A and 1B, according to a preferred embodiment, a suspension system 100 may comprise a mount 102 which supports a first reel 104. The first reel 104 extendably and retractably supports a flexible member 110 which supports an equipment support member 112 having an equipment mount 114. Equipment attached to the equipment mount 114 may be supported and moved. The flexible member 110 may comprise a cable, rope, string and so forth and may comprise metal, nylon, plastic and so forth. The flexible member 110 may also comprise optical fiber or power cable attached to the equipment. The first reel 104 extends and retracts the flexible member 110 through a suspension point 120. The flexible member 110 is attached to at least one of an attachment point 106 and a common point 108.

A first distance 116 is defined from the first row of equipment support members 112 to the attachment point and a second distance 117 is defined from each of the other equipment support members 112 to the common point 108 in the row above. The first distance 116 and the second distance 117 are increased when the reel 104 extends the flexible member 110 and decreased when the reel 104 retracts the flexible member 110. The mount 102 may comprise wood, metal and so forth. The mount 102 is preferably attached to a ceiling or more preferably is supported on the floor with a footprint larger in size than the area enclosed by the suspension points 120. The attachment point 106 and the common point 108 may be a loop or a hook and may comprise metal, plastic and so forth. The common point 108 could be a gimbal, preferably a gimbal to attach the first common point connector 604 and another gimbal to connect second common point connector 702. The equipment mount 114 may be a lockable gimbal. The equipment mount 114 may be motorized and controllable. If the equipment is a camera, there may also be a focus controller and zoom controller which may be computer controlled or operator controlled. When the flexible member 110 is extended or retracted, the equipment support member 112 may travel along the flexible member 110 towards the point of lowest gravitational potential energy. The equipment support member 112 has a common point 108 for attaching to the flexible member 110. The equipment mounts 114 can be spaced apart by the suspension system 100. Each equipment support member 112 may have a flexible member 110 to travel along. The number of flexible members 110 and equipment support members 112 may be the same and may be at least 3, at least 6, at least 8, at least 16, at least 20, at least 32, at least 64, at least 80, at least 128 and so forth. The equipment may be cameras, lights, projectors or a combination.

Referring now to FIG. 2A, FIG. 2B, FIG. 3A and FIG. 3B, according to an embodiment, a suspension system 100 may comprise a mount 118 which supports a first reel 201 and a second reel 202. The first reel 201 extendably and retractably supports a first cable 110 and the second reel 202 extendably and retractably supports a first, a second and a third of a plurality of second cables, 119, 120, 121. The first cable 110 supports a first equipment support member 112 by attaching to a first attachment point 101. A second attachment point 102 supports the first of the plurality of second cables 119. A second equipment support member 113 travels along at least one of the first of the plurality of second cables 119 and one of the second of the plurality of second cables 120 by a first traveler 103 and supports at least one of another of the second of the plurality of second cables 120 and the third of the plurality of second cables 121 from the third attachment point 104. A third equipment support member 114 travels along the third of the plurality of the second cables 121 by a second traveler 105. The first, second and third equipment support members 112,113,114 each have an equipment mount 115. Equipment attached to the equipment mount 115 may be supported and moved up and down by controlling the first reel 201 and closer and further apart from each other by controlling second reel 202. The first cable, the first, second and third of the plurality of second cables 110, 119, 120, 121 may comprise a cable, rope, string and so forth. The second and third attachment points 102, 104 and the first and second travelers 103, 105 may comprise pulleys made of metal, nylon, plastic and so forth. The mount 118 may comprise wood, metal and so forth.

Figure 2A:
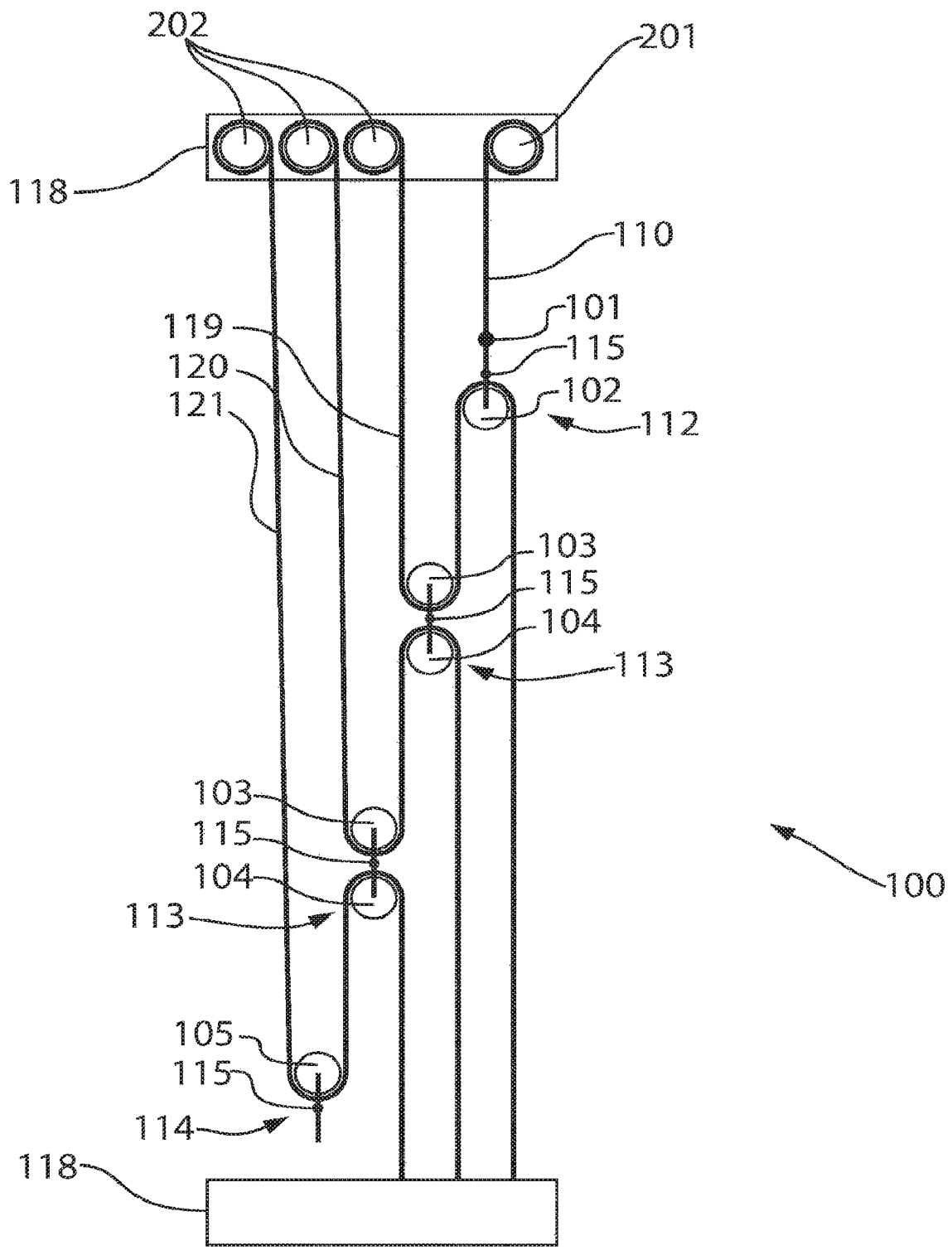
FIG. 2A shows a side view of a suspension system according to an embodiment showing each of the plurality of second cables.
Figure 2B:
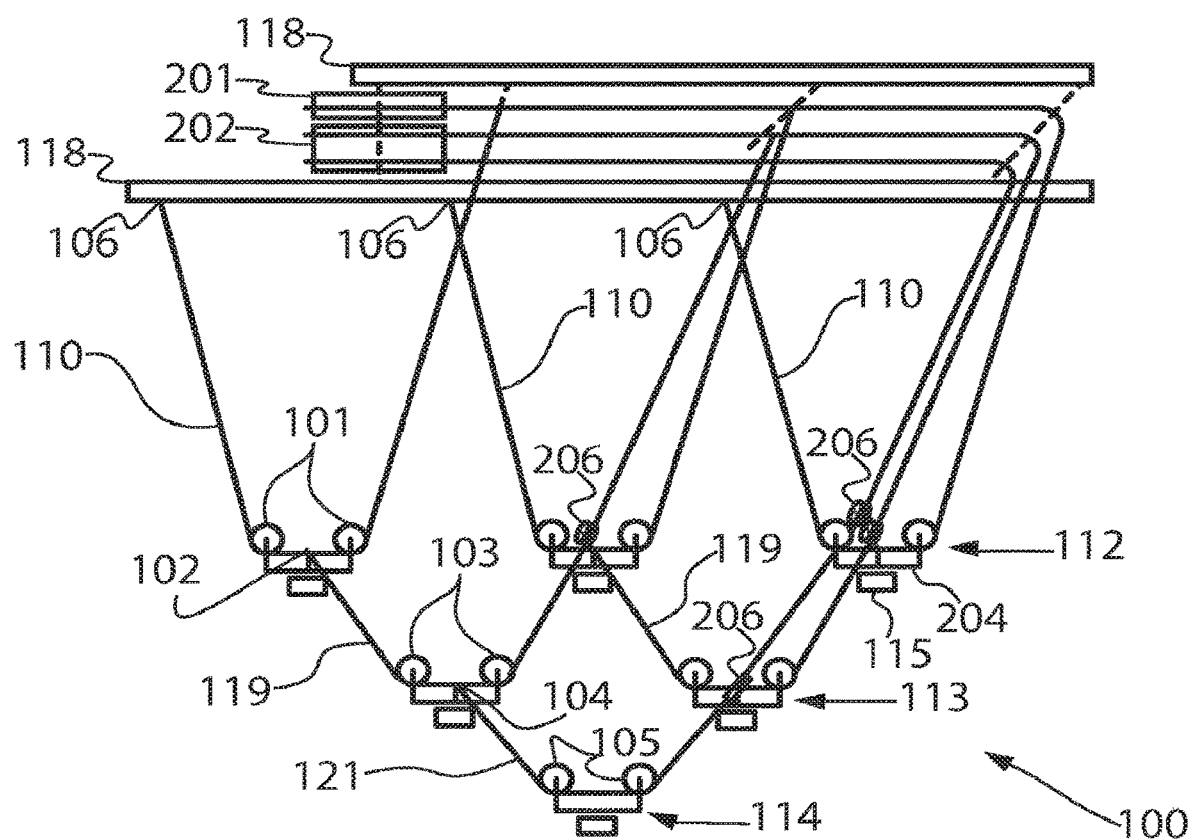
FIG. 2B shows a front view of a suspension system according to the embodiment of FIG. 2A.
Figure 3A:
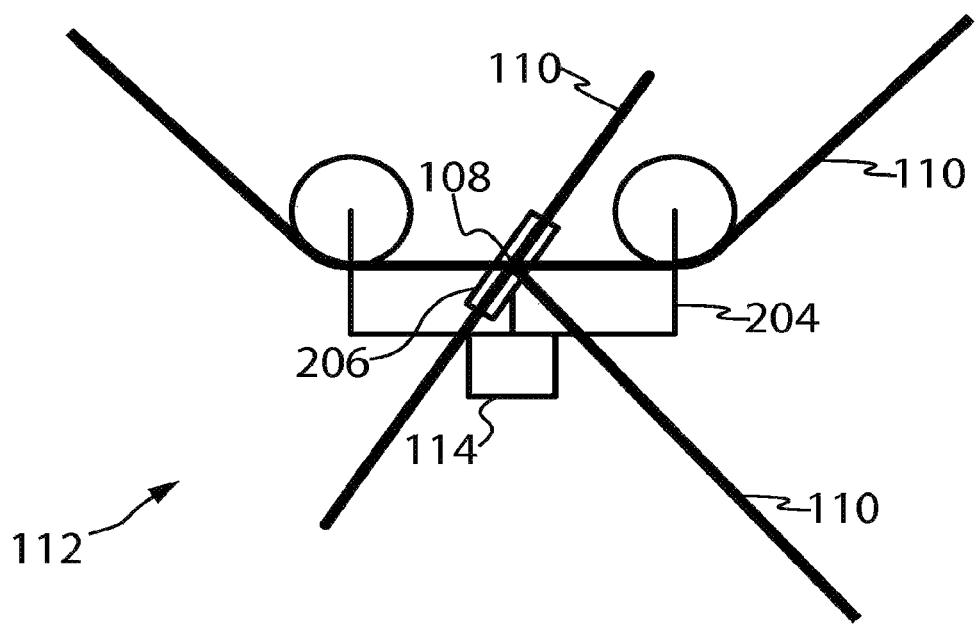
FIG. 3A shows a front view of an equipment support member according to a preferred embodiment.
Figure 3B:
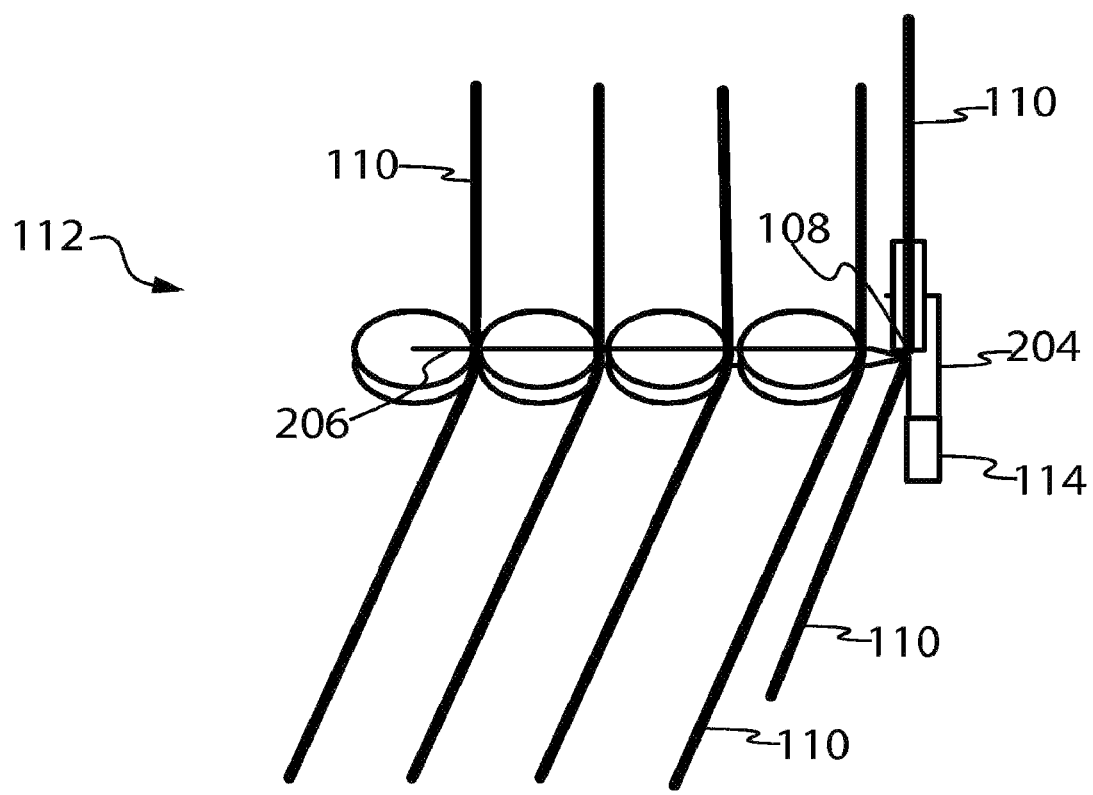
FIG. 3B shows a side view of an equipment support member according to a preferred embodiment.

Referring to FIG. 2B, the suspension system may further comprise a third traveler 206 which keeps the first, second, and the third of the plurality of second cables 119, 120, and 121 organized as it passes the equipment support members 112, 113, and 114.

Figure 4A:
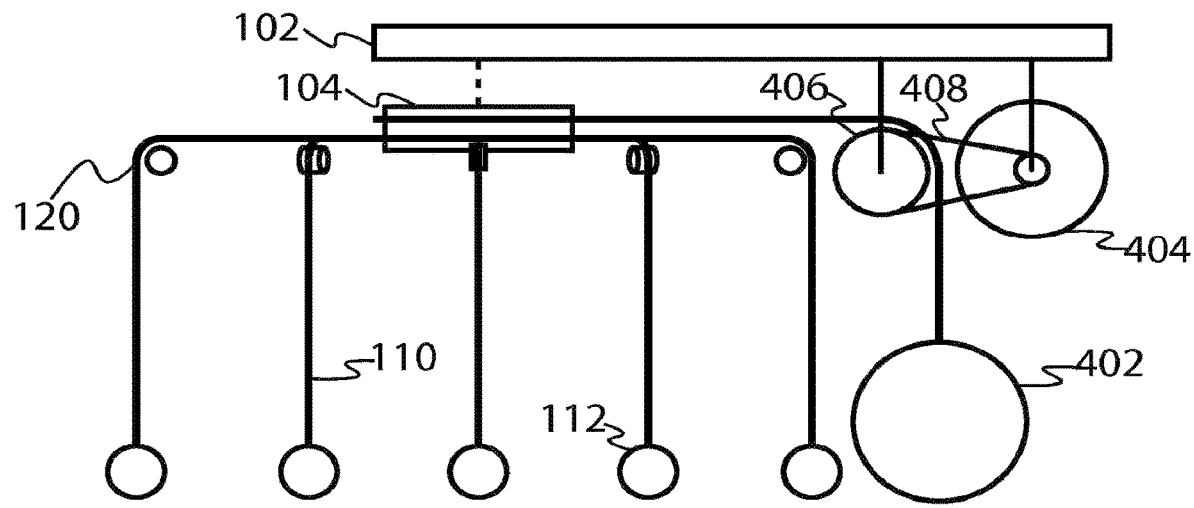
FIG. 4A shows a front view of a power source and a counterweight, according to a preferred embodiment. The flexible member going to the equipment support member is shown as a single line.
Figure 4B:
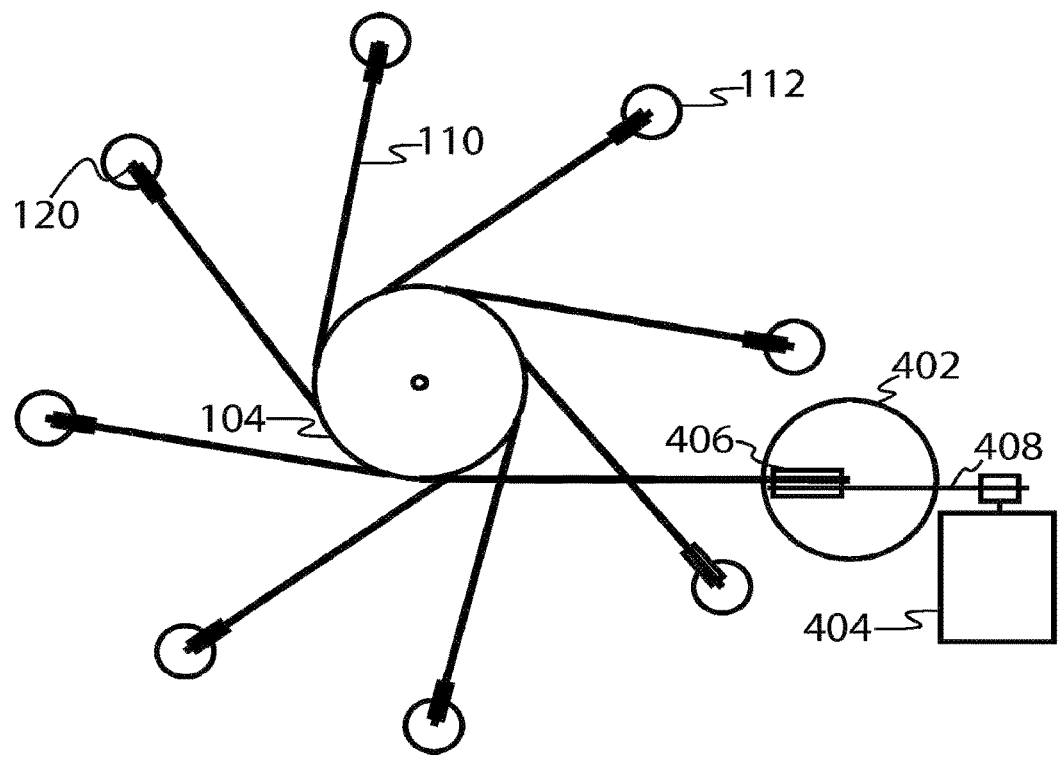
FIG. 4B shows a top view of a power source and a counterweight, according to a preferred embodiment. The flexible member going to the equipment support member is shown as a single line.

Referring now to FIG. 4, according to a preferred embodiment, an equipment support member 112 with attached equipment defines a "laden" equipment support member 112. A first reel 102 may comprise a counterweight 402 configured to balance the weight of all the "laden" equipment support members supported by the first reel 102. The counterweight 402 may comprise lead, water in a container or any known weight. The counterweight 402 may weigh approximately equal to the number of "laden" equipment support members times the weight of each. For example, if 80 "laden" equipment support members weigh 0.5 kg each, then 80*0.5 kg equals 40 kg and the counterweight 402 may weigh substantially 40 kgs. A power source 404 may comprise an electric motor, hydraulic ram, hand crank, manually raising and lowering the counterweights and so forth. A drive belt 406 may comprise a belt, v-belt, chain, cable, rope and so forth. A drive pulley 408 may comprise metal, wood, plastic and so forth. A power source 404 may be added to raise and lower the equipment support members 112. The first reel 104 may be operated by a power source 404 which may comprise a winch. The winch may be motorized or hand operated. The motorized winch may be computer controlled or button operated by a user. A ratchet or automatic lock to lock the position of the equipment support members 112 may be a safety mechanism.

Figure 5A:
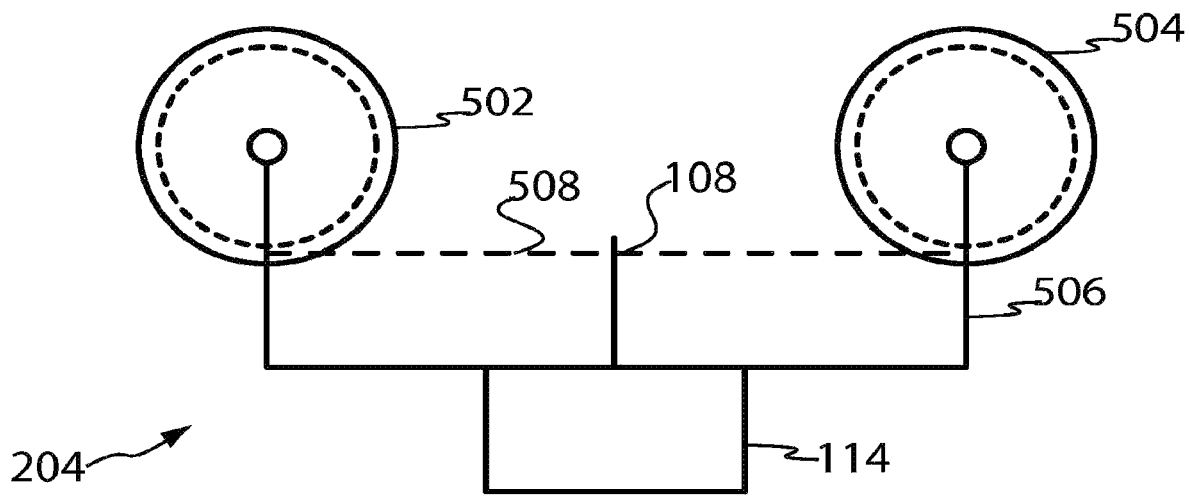
FIG. 5A shows a front view of a second traveler according to a preferred embodiment.
Figure 5B:
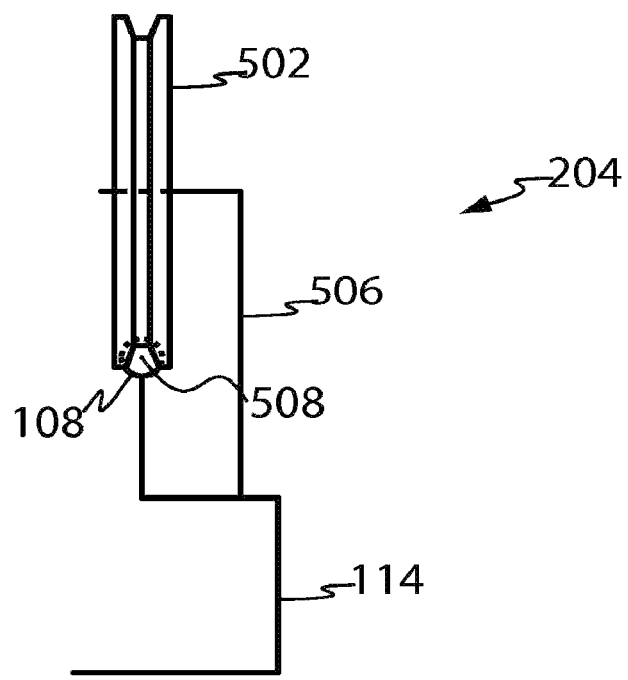
FIG. 5B shows a side view of a second traveler according to a preferred embodiment.

Referring now to FIG. 5, according to a preferred embodiment, the first traveler 204 is configured to freely travel along the flexible member 110 and to align itself parallel to the line between the suspension point 120 and at least one of the common point 108 and the attachment point 106. A first traveler 204 may comprise a first pulley 502, a second pulley 504, a first pulley housing 506 and a centerline 508 defined as the centerline of the flexible member 110 configured to support the first traveler 204. The distance spanned by the first traveler pulleys 502,504 may be similar to the width of equipment. For example if the equipment is 30 cm, 20 cm or 10 cm wide then the distance between pulleys 502,504 may be approximately 30 cms or 20 cms or 10 cms respectively. The common point 108 is on the midpoint of the centerline 508. The common point 108 may comprise a loop or hook surrounding the midpoint.

Figure 6A:
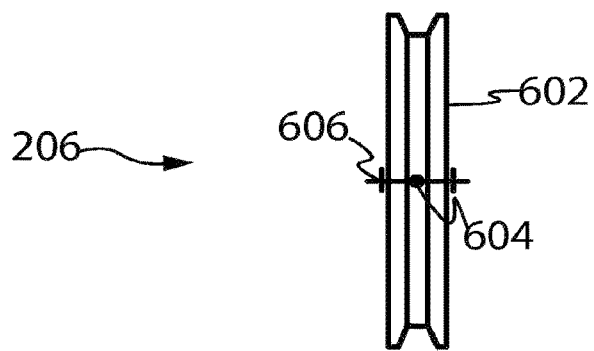
FIG. 6A shows a front view of a first traveler and equipment mount according to a preferred embodiment.
Figure 6B:
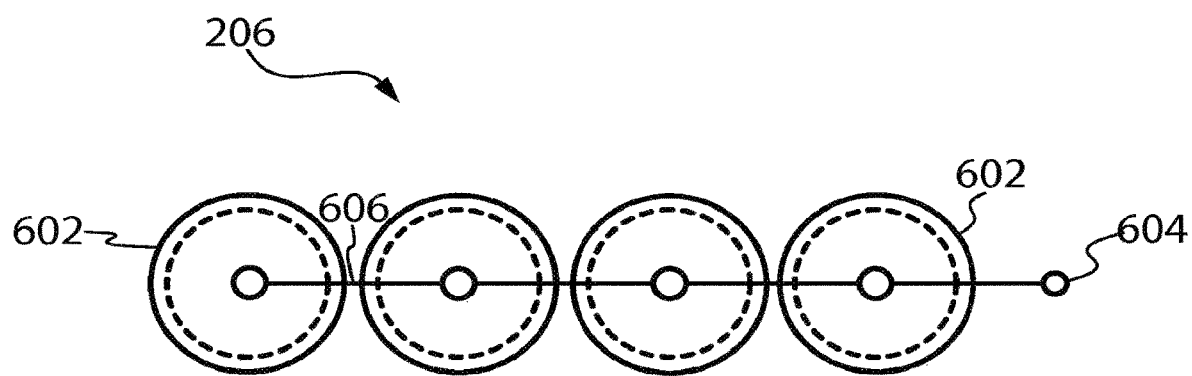
FIG. 6B shows a side view of a first traveler and equipment mount according to a preferred embodiment.

Referring now to FIG. 6, according to a preferred embodiment, a second traveler 206 may comprise a third pulley 602 comprising metal, wood, plastic and so forth, a first common point connector 604 and a second pulley housing 606. The second traveler 206 is configured to reroute the flexible members 110 through the equipment support member 112 without substantially rotating the equipment support member 112. The pulleys 602 may be inline to provide a) freedom of movement and b) a low profile so as not to hinder equipment support members 112 getting close together. The second traveler 206 may comprise a pulley, a loop or a hook to slidably contain the flexible member 110.

Figure 7:
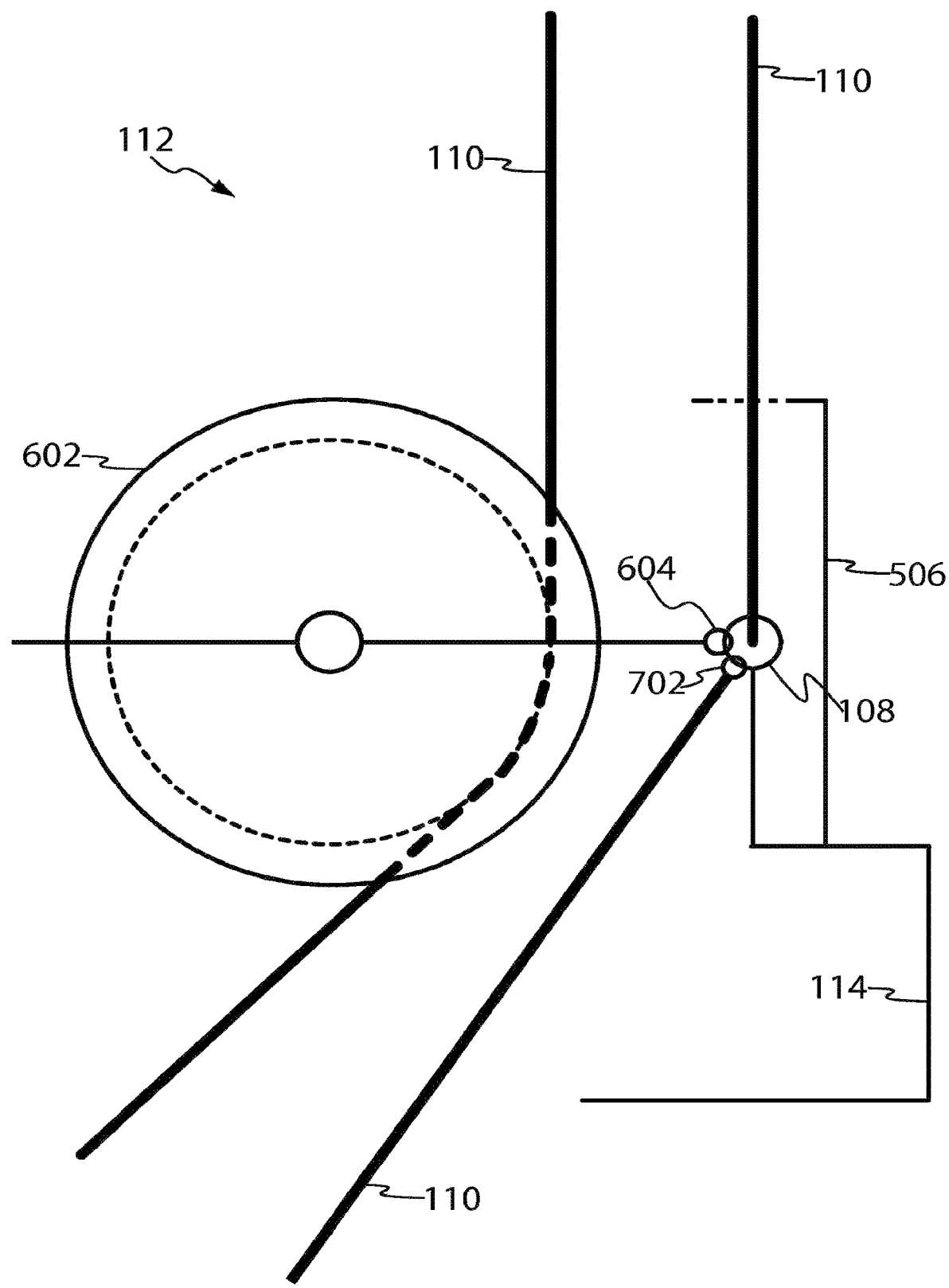
FIG. 7 shows a side view of an equipment support member according to a preferred embodiment, not showing a first pulley and a second pulley to more clearly show the common point.

Referring now to FIG. 7, according to a preferred embodiment, the flexible member 110 comprises a second common point connector 702. The second common point connector 702 couples the common point 108. The first and second common point connectors 604, 702 may comprise loops or hooks and the loops or hooks couple substantially at the common point 108.

The loops or hooks are configured not to touch the flexible member 110 as it passes between the pulleys 502, 504 (not shown).

Figure 8:
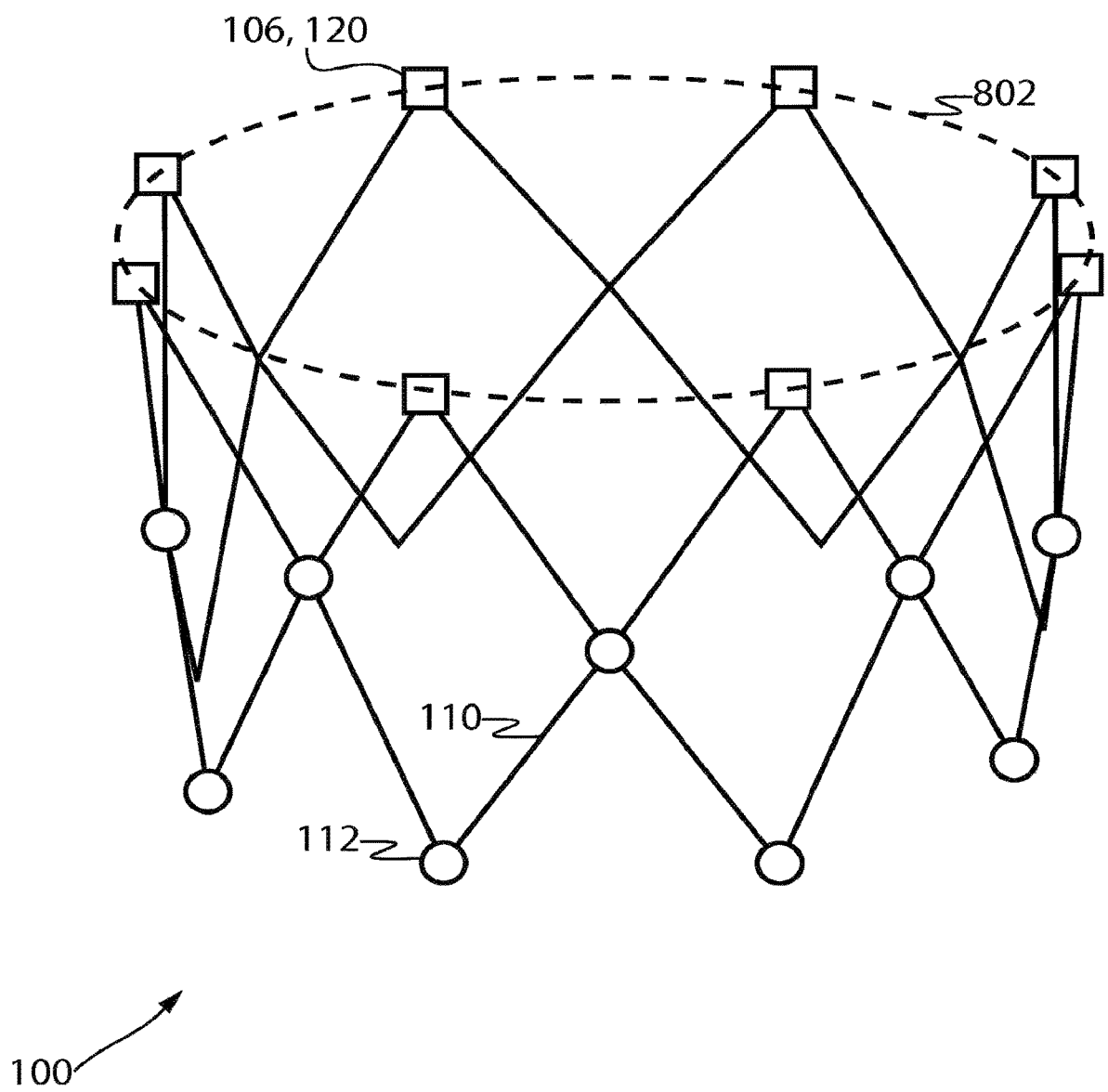
FIG. 8 shows a perspective view of the equipment support members forming a curved surface in this case a closed curved surface, according to a preferred embodiment. Only the equipment support members on the viewer-closest side of the curved surface are shown.

Referring now to FIG. 8, according to a preferred embodiment, the suspension system 100 may comprise a curve of suspension points 802 which may be a line, a curve or a loop. When the suspension points 120 and attachment points 106 form a curve, the suspended equipment support members 112 form a curved surface. The curved surface is capable of surrounding a subject. When the curve is a circle, then the curved surface is a cylinder and a subject may be completely enclosed by equipment supported by the suspension system 100.

Figure 9:
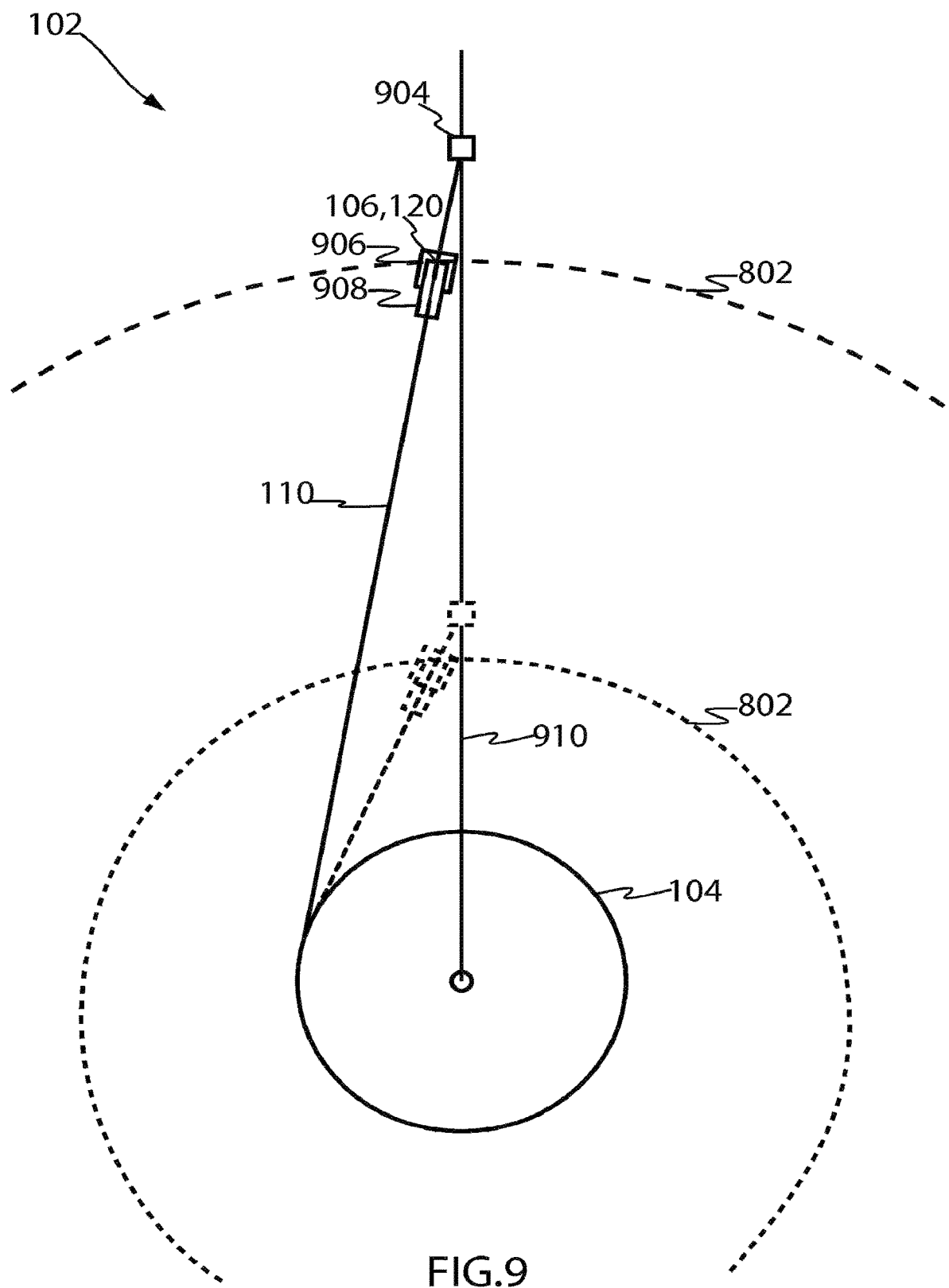
FIG. 9 shows a top view of a third traveler and a suspension point on the mount, according to a preferred embodiment.

Referring now to FIG. 9, according to a preferred embodiment, the mount 102 may comprise a third traveler 904 and a rail 910. The third traveler 904 may comprise a third pulley housing 906 and a fourth pulley 908. The suspension points 120 and attachment points 106 can be positioned and locked by the third traveler 904 on the rail 910. The third traveler 904 is configured to travel freely along the flexible member and travel lockably on the rail 910. The rails 910 may emanate from a center of the suspension system 100 so that many curves may be created by the suspension points 120 and the attachment points 106 and thus suspend many curved surfaces of equipment support members 112.

The various aspects of the embodiments shown in FIGS. 1 to 9 may be mixed and matched as desired, where possible. Further the present invention is not limited to only those embodiments shown. For example, there may be other ways to provide tension to the flexible member other than gravity. The mount might be on the sea floor and buoyancy forces acting on the equipment support members may replace gravity as the opposing force of suspension, for underwater 3D reconstruction. Other variations are within the scope of the present invention.

I claim:

1. A suspension system for supporting equipment comprising:
   a first cable;
   a first, a second and a third of a plurality of second cables;
   a mount comprising:
      a first reel configured to extendably and retractably support the first cable; and
      a second reel configured to extendably and retractably support the first, the second and the third of the plurality of second cables;
   a first equipment support member comprising:
      a first attachment point attached to the first cable; and
      a second attachment point supporting the first of the plurality of second cables;
   a second equipment support member comprising:
      a first traveler traveling along at least one of the first of the plurality of second cables and one of the second of the plurality of second cables;
      a third attachment point supporting at least one of another of the second of the plurality of second cables and the third of the plurality of second cables; and
   a third equipment support member comprising:
      a second traveler traveling along the third of the plurality of second cables,
   wherein the first, second and third equipment support members further comprise an equipment mount configured to support equipment, and
   wherein the first reel is capable of controlling the up and down motion of the first, second and third equipment support members, and the second reel is capable of controlling the vertical separation between the first, second and third equipment support members.

* * * * *